United States Patent
Alland

(10) Patent No.: US 7,474,262 B2
(45) Date of Patent: Jan. 6, 2009

(54) DIGITAL BEAMFORMING FOR AN ELECTRONICALLY SCANNED RADAR SYSTEM

(75) Inventor: Stephen W. Alland, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 190 days.

(21) Appl. No.: 11/172,684

(22) Filed: Jul. 1, 2005

(65) Prior Publication Data

US 2007/0001897 A1 Jan. 4, 2007

(51) Int. Cl.
*H01Q 3/38* (2006.01)

(52) U.S. Cl. .................. 342/371; 342/374; 342/101

(58) Field of Classification Search .......... 342/371–377
See application file for complete search history.

(56) References Cited

U.S. PATENT DOCUMENTS

| | | | | |
|---|---|---|---|---|
| 3,276,019 A | * | 9/1966 | Fackler ........................ | 455/81 |
| 3,500,407 A | | 3/1970 | Thompson | |
| 3,803,625 A | * | 4/1974 | Nemit ........................ | 342/368 |
| 3,833,904 A | * | 9/1974 | Gebhardt et al. .............. | 342/83 |
| 3,858,206 A | * | 12/1974 | Scheidler et al. .............. | 342/83 |
| 4,041,501 A | * | 8/1977 | Frazita et al. ................ | 343/844 |
| 4,103,302 A | * | 7/1978 | Roeder et al. ................ | 342/113 |
| 4,423,420 A | * | 12/1983 | Krajewski ................... | 342/400 |
| 4,431,995 A | * | 2/1984 | Barton et al. ................ | 342/373 |
| 4,549,184 A | | 10/1985 | Boles et al. | |
| 4,652,880 A | * | 3/1987 | Moeller et al. ............... | 342/373 |
| 4,962,381 A | * | 10/1990 | Helbig, Sr. .................. | 342/372 |
| 5,103,233 A | * | 4/1992 | Gallagher et al. ........... | 342/408 |
| 5,307,073 A | * | 4/1994 | Riza ............................ | 342/372 |
| 5,657,026 A | * | 8/1997 | Culpepper et al. .......... | 342/374 |
| 6,018,317 A | * | 1/2000 | Dogan et al. ................. | 342/378 |
| 6,067,048 A | | 5/2000 | Yamada | |
| 6,285,312 B1 | * | 9/2001 | Thomassen .................. | 342/157 |
| 6,559,797 B1 | * | 5/2003 | Chang ......................... | 342/368 |
| 6,590,532 B1 | * | 7/2003 | Ogawa et al. ................ | 342/378 |

(Continued)

FOREIGN PATENT DOCUMENTS

DE 102 61 027 7/2004

(Continued)

OTHER PUBLICATIONS

Communication from European Patent Office for European Application No. 06076223.4—2220, Nov. 28, 2007 (6 pages).

(Continued)

*Primary Examiner*—Thomas G. Black
*Assistant Examiner*—Shelley Chen
(74) *Attorney, Agent, or Firm*—Jimmy L. Funke

(57) ABSTRACT

Digital beamforming is provided for use with electronically scanned radar. In an aspect, the present invention provides enhanced sensitivity, wide angle or field of view (FOV) coverage with narrow beams, minimized number of receivers, reduced sidelobes, eliminated grating lobes and beam compensation for target motion. In an aspect, the present invention employs a uniform overlapped subarray feed network, a time multiplexed switch matrix, and a restructured digital signal processor. Antenna channels share a receiver, rather than maintain a dedicated receiver for each antenna element, as in conventional systems. In an aspect, Doppler/frequency filtering is performed on each antenna element or subarray output prior to digital beamforming. Further, Doppler compensation is employed following Doppler/frequency filtering, followed by digital beamforming.

14 Claims, 7 Drawing Sheets

U.S. PATENT DOCUMENTS

| | | |
|---|---|---|
| 6,661,376 B2 * | 12/2003 | Maceo et al. ............... 342/373 |
| 6,823,170 B1 * | 11/2004 | Dent ......................... 455/13.3 |
| 6,859,168 B2 * | 2/2005 | Isaji .......................... 342/128 |
| 6,999,724 B2 * | 2/2006 | Chizhik et al. ............. 455/63.1 |
| 7,167,139 B2 * | 1/2007 | Kim et al. .................. 343/785 |
| 2002/0012289 A1 * | 1/2002 | Gilbert et al. ............... 367/135 |
| 2003/0095067 A1 * | 5/2003 | Howell ....................... 342/377 |
| 2004/0164891 A1 | 8/2004 | Schoeberl et al. |
| 2005/0018540 A1 * | 1/2005 | Gilbert et al. ............... 367/138 |
| 2005/0195103 A1 | 9/2005 | Davis et al. |
| 2006/0164294 A1 | 7/2006 | Gottwald et al. |
| 2006/0244656 A1 * | 11/2006 | Lawrence et al. ...... 342/357.02 |
| 2007/0001897 A1 * | 1/2007 | Alland ........................ 342/70 |

FOREIGN PATENT DOCUMENTS

| | | |
|---|---|---|
| EP | 1 321 776 | 6/2003 |
| EP | 1 431 773 | 6/2004 |
| EP | 1 522 869 | 4/2005 |
| JP | 2000/258524 | 9/2000 |
| WO | 0072462 A2 | 11/2000 |
| WO | 03/043125 | 5/2003 |
| WO | 03043125 A1 | 5/2003 |
| WO | 2004/021512 | 3/2004 |

OTHER PUBLICATIONS

EP Search Report dated Jun. 23, 2008.

* cited by examiner

DIGITAL BEAMFORMING FOR AN ELECTRONICALLY SCANNED RADAR SYSTEM

FIELD OF THE INVENTION

The invention relates generally to a high performance and low cost radar system, and more particularly to digital beamforming for use with electronically scanned radar.

BACKGROUND OF THE INVENTION

Numerous current radar systems, including automotive radar systems, require wide angle coverage having narrow beams and a high update rate, all in a small package size. Current automotive radar systems for applications including collision warning, pre-crash sensing and adaptive cruise control incorporate a fixed beam, switched beam or mechanically scanned antenna that limit performance by falling short of these previously mentioned requirements. In the case of mechanically scanned antennas, the update rate is too slow for current demands, system size and cost are high, and reliability is low.

Electronically scanned antennas are also employed with radar systems. Allowing an antenna to electronically scan has benefits over a mechanically scanned antenna, including fast scanning, the ability to host multiple antenna beams on the same array, eliminating mechanical complexity and reliability issues, a wide field of view, a narrow beam and a high update rate. However, conventional electronically scanned antennas using discrete phase shifters are expensive and introduce excessive RF loss at typical automotive radar frequencies (i.e., 24 GHz and 76 GHz).

Digital beamforming is an alternative method of electronic scanning whereby individual antenna elements or subarrays are downconverted and sampled, and beam scanning is performed by a digital signal processor. However, current digital beamforming architectures often exhibit high cost and inadequate performance, including inadequate field of view (FOV), poor sensitivity, numerous grating lobes, high sidelobes and beam pattern distortion due to target motion.

Further, depending on the system configuration, digital beamforming frequently requires numerous receiver channels. For example, with a narrow beam, a large array is utilized and numerous elements are employed. A dedicated receiver is conventionally utilized for each antenna element, adding cost to the system. Multiplexing to a minimal number of receivers is impractical since an unacceptable multiplexing loss can occur. For arrays of more than a few elements, the multiplicity of required receivers is exceedingly expensive for typical automotive radar.

SUMMARY OF THE INVENTION

A high performance and low cost electronically scanned radar system and method is described herein. The present invention provides enhanced sensitivity, wide angle or field of view (FOV) coverage with narrow beams, reduced number of receivers employed, reduced sidelobes, eliminated grating lobes and beam compensation for target motion. Additionally, a high update rate is provided, and the system is provided in a small size.

In an embodiment, the present invention can be utilized for automotive radar systems such as collision warning, pre-crash sensing, ACC, stop and go, lane change warning, and back-up and parking aid. Further, in an embodiment, a multi-mode radar system is provided for short-range, medium-range and long-range systems.

Features of the invention are achieved in part, in an embodiment, by employing a uniform overlapped subarray feed network, a time multiplexed switch matrix, and a restructured digital signal processor.

In an embodiment, a uniform overlapped subarray feed network is employed. By partitioning the array into subarrays, the phase center spacing of the subarrays determines the grating lobe locations. By overlapping the subarrays, a specific phase center spacing is formed, which defines grating lobe locations. Further, by overlapping the subarrays, a narrow subarray pattern is formed relative to the spacing of the grating lobes, and the grating lobes are maintained out of the subarray main lobe and are rejected by the subarray side lobes, thereby eliminating grating lobes. The antenna beam is scanned without grating lobes or high sidelobes.

Additionally, in an embodiment, an antenna is partitioned into subarray outputs and a time multiplexed switch matrix is employed, which minimizes the number of required receivers, minimizing system cost. In an embodiment, antenna channels share a receiver, rather than maintain a dedicated receiver for each antenna element or subarray. The receiver downconverts and digitizes signals from each antenna subarray.

Target motion combined with a time sequenced sampling of the array elements or subarrays induces a differential phase shift across the array that is unrelated to angle. In an embodiment, a conventional digital signal processing sequence, which combines signals arriving from each antenna element or subarray, is restructured. In the present invention, Doppler/frequency filtering is performed on each antenna element or subarray output prior to digital beamforming. Further, Doppler compensation is employed following the Doppler/frequency filtering, followed by digital beamforming. The Doppler compensation compensates for a target motion induced phase shift for the center frequency of the particular Doppler/frequency filter. Doppler induced beam pattern distortion inherent in the time multiplexed digital beamforming is minimized. Additionally, Doppler compensation and digital beamforming are performed separately on each frequency of the received signals from the Doppler/frequency filter.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention. Further, unless indicated to the contrary, any numerical values set forth in the following specification and claims are approximations that may vary depending upon the desired characteristics sought to be obtained by the present invention.

A system and method is described herein for providing a high performance and low cost electronically scanned radar system and method. The present invention can provide enhanced sensitivity, wide angle or field of view (FOV) coverage with narrow beams having high resolution, reduced number of receivers employed, reduced sidelobes, eliminated grating lobes and beam compensation for target motion. Additionally, a high update rate is provided, and the system is provided in a small size.

In an embodiment, a time shared switched receive digital beam beamforming (RDBF) method and system is employed. In an embodiment, a digital signal processor is restructured as compared to contemporary systems. Doppler compensation and digital beamforming are performed separately on each frequency of signals received from a Doppler/frequency filter.

Automotive radar-based systems can benefit from the present invention such as collision warning, pre-crash sensing, adaptive cruise control (ACC), stop and go, lane change warning, and back-up and parking aid. ACC is a system extension of standard cruise control that maintains a constant timed headway to a closest in-path vehicle via throttle and brake control. Stop and go is a system extension of ACC whereby the system can cause a vehicle to follow a lead vehicle to a stop if needed, and then after the stop a driver must initiate a resume (go) function. It is to be appreciated that embodiments of this system can be applied to applications in both radar and communications systems.

Figure 1:
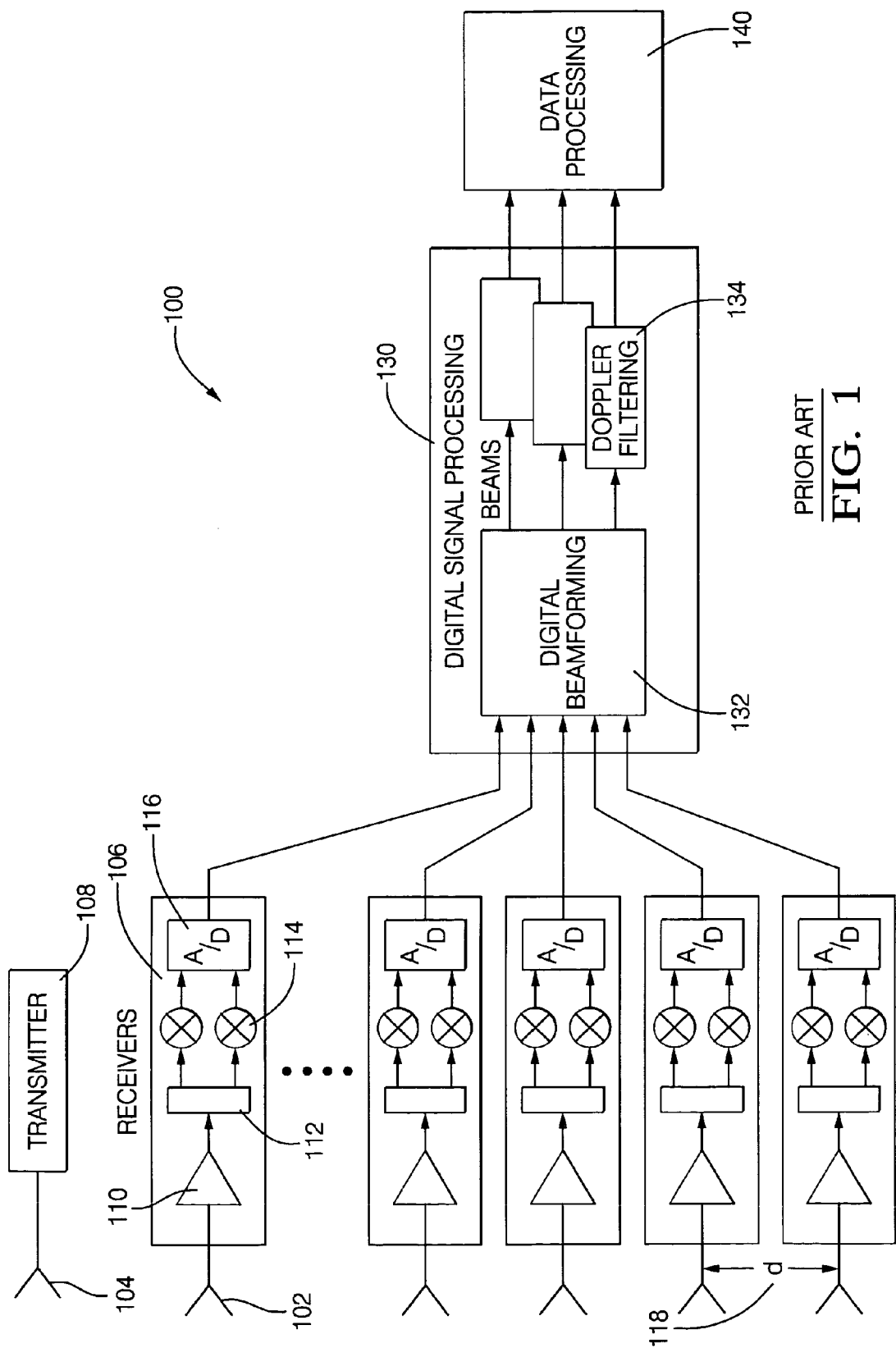
FIG. 1 is a diagrammatic sectional view of a contemporary digital beamforming architecture utilizing numerous receivers.

Referring to the drawings wherein identical reference numerals denote the same elements throughout the various views, FIG. 1 illustrates a contemporary digital beamforming architecture 100. Transmitter 108 includes antenna elements 104 and receivers 106 include antenna elements 102. Antenna elements 102 are spaced by length 118, which is typically one-half of the radar wavelength. Receivers 106 downconvert and digitize the incoming signal from each antenna element 104. Receivers 106 can include an RF amplifier 110, a splitter 112 leading to a quadrature down converter 114, followed by an analog to digital converter 116. Two in-phase/quadrature modulator (I,Q) channels are formed, and the resulting I,Q output phase difference is 90 degrees. The digital signals from each antenna port are combined in the digital signal processor 130, where amplitude and phase weighing is utilized to form and steer beams. The digital signal processor 130 includes digital beamforming 132 followed by Doppler filtering 134. Data processing 140 then follows Doppler filtering 134.

As illustrated, the conventional digital beamforming architecture incorporates a dedicated receiver for each antenna element. For arrays of more than a few elements, the multiplicity of receivers is exceedingly expensive for automotive radar. That is, when a wide beam is sufficient, an electrically small aperture can be utilized. With an electrically small aperture, a minimal number of elements are utilized and thus a minimal number of receivers are employed and a conventional system may suffice. However, when a narrower beam is needed, then a larger array and additional elements are utilized and thus added receivers are required. By adding receivers, expense, and sometimes size, is increased. That is, it is to be appreciated that if a higher cost architecture is acceptable, then a conventional architecture with additional elements and added receivers can be used to produce a narrower beam. However, for a low cost architecture in the case of many applications (i.e., automotive systems) a conventional architecture is limited to a minimal number of elements and hence a wide beam.

When the antenna elements 102 are spaced by length 118 equal to one-half of the radar wavelength, undesirable grating lobes are avoided. However, this spacing creates a large number of elements, which requires numerous receiver channels. Alternatively, in an embodiment of the present invention, a time multiplexed switch matrix can be used, limited by complex switch multiplexing and attendant losses. The number of elements and the associated number of receivers or switch multiplexing can be reduced by using element spacing greater than one-half wavelength. However, in this case, undesirable grating lobes are observed. The further apart the phase centers, the more grating lobes occur. Further, reducing the number of elements reduces the antenna gain.

To decrease the number of outputs (and associated receivers) for a large array, while maintaining gain, the antenna is partitioned into subarrays. However, the number of subarrays is typically still significant and, in contemporary digital beamforming systems, numerous expensive receivers are utilized. In the present invention, one or several receivers are shared among the antenna elements or subarrays in a time multiplexed structure. In an embodiment of the present invention, the number of subarrays employed is in the range of eight to sixteen subarrays and a single receiver is utilized. When more than eight to sixteen subarrays are employed, an additional receiver is employed, for minimizing multiplexing loss.

Figure 6:
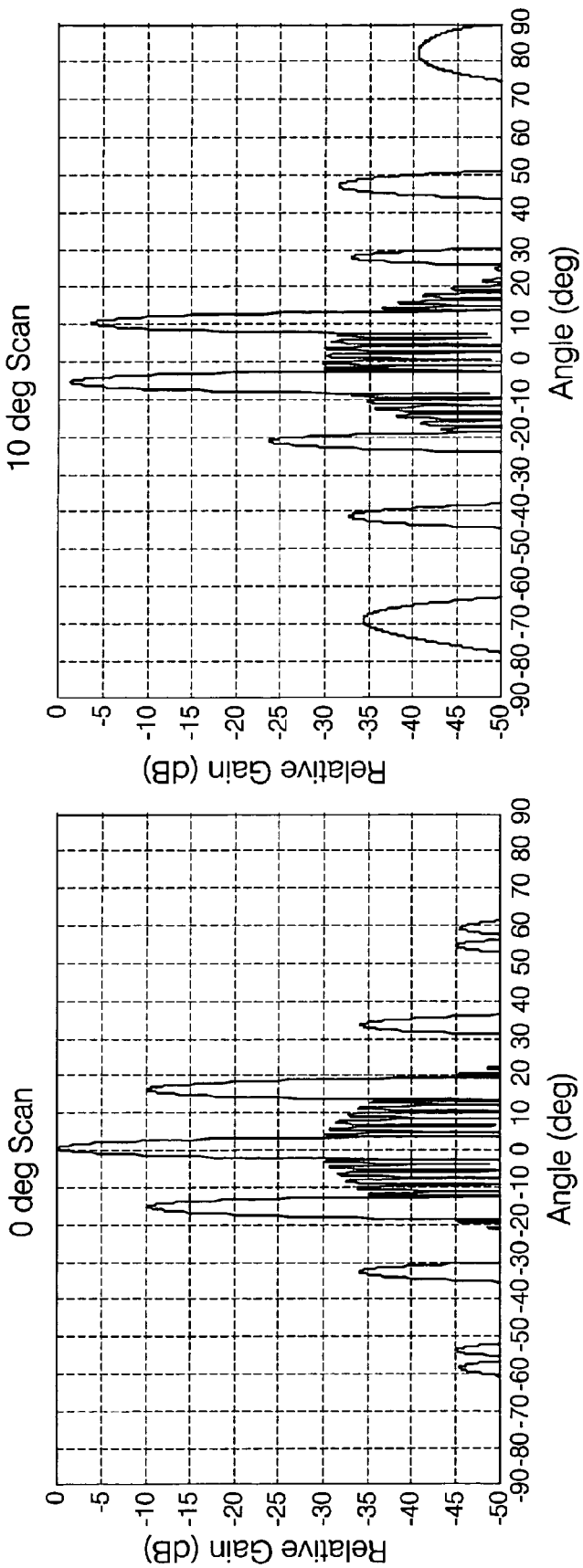
FIG. 6 is a graphical illustration of example beam patterns with uniform, non-overlapping subarrays.

Using subarrays to reduce the number of antenna outputs can lead to an undesirably large spacing between the subarray phase centers in the scanning dimension, resulting in grating lobes, as illustrated in FIG. 6 infra. When an array is partitioned into subarrays, the phase center spacing of the subarrays determines the grating lobe locations. Grating lobes can be mitigated by non-uniform or randomized subarray size and spacing. However, this requires a large number of subarrays to provide low sidelobes. Further, in effect, the grating lobe energy is distributed over wide angles and high sidelobes are created.

In an embodiment of the present invention, the grating lobes are suppressed by forming a narrow subarray pattern. As used herein, a narrow subarray pattern is meant to be understood as narrow relative to the location or spacing of grating lobes. This way the grating lobes are maintained out of the subarray main lobe and are rejected by the subarray sidelobes, suppressing the grating lobes. A narrow subarray pattern is formed by overlapping the subarrays. That is, by overlapping the subarrays, the subarrays can be larger, thereby narrowing the subarray beam without increasing their phase center spacing. Alternatively, for a given subarray size, the subarrays can be moved closer together by overlapping to decrease their phase center spacing. In either case, overlapping is employed to obtain a narrow subarray pattern relative to the spacing of the grating lobes, which is determined by the phase center spacing of the subarrays. Further, by forming the overlapped subarrays in a uniform structure, equal phase center spacing is accomplished, defining grating lobe locations. The subarray main lobe is narrowed, and the grating lobes are formed outside the subarray main lobe.

Figure 2:
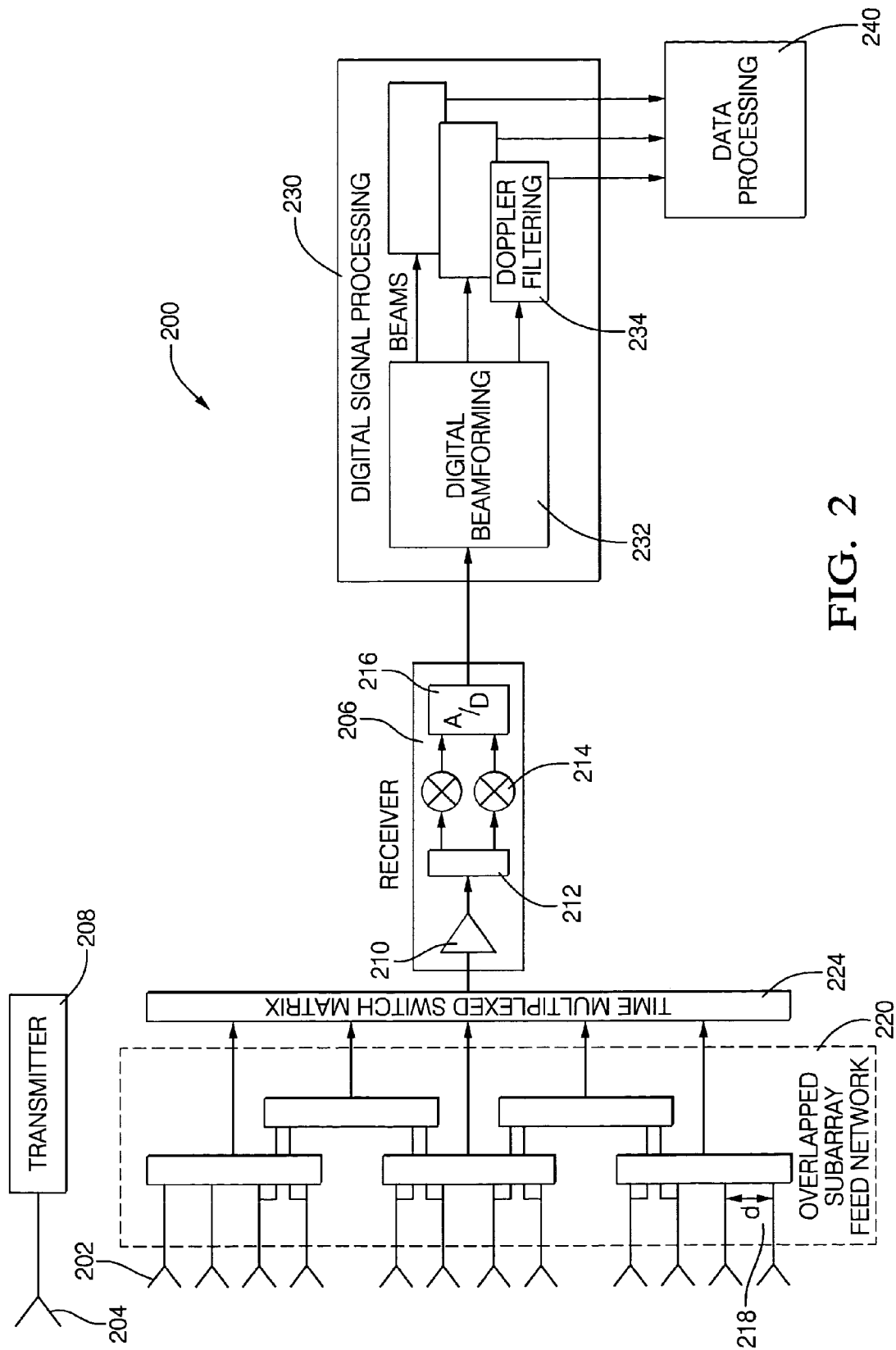
FIG. 2 is a diagrammatic sectional view of an overlapped subarray feed network and time-multiplexed digital beamforming architecture, in accordance with an embodiment of the present invention.

FIG. 2 shows an overlapped subarray feed network and time-multiplexed digital beamforming architecture 200, in an embodiment of the present invention. Receiver 206 receives a signal from antenna elements 202 via overlapped subarray feed network 220 and a time multiplexed switch matrix 224. Also shown is transmitter 208 including antenna element 204. Receiver 206 downconverts and digitizes the incoming signal from each antenna subarray. Receiver 206 can include an RF amplifier 210, a splitter 212 leading to a quadrature down converter 214, followed by an analog to digital converter 216. Receiver 206 transmits signals to the digital signal processor 230, which includes digital beamforming 232 followed by Doppler filtering 234. Data processing 240 then follows Doppler filtering 234. The data processing 240 performs numerous functions including target detection, parameter estimation, target grouping, target tracking and target classification.

As discussed, for arrays of more than a few elements or subarrays, the multiplicity of receivers in contemporary architectures can be exceedingly expensive. In an embodiment of the present invention, a minimized number of receivers are employed and time multiplexed with the outputs of subarray feed network 220. In another embodiment, one receiver (receiver 206) is employed. The selection of number of receivers employed can depend on considerations including complexity of time multiplexing, RF loss and time multiplexing loss. That is, when incorporating a minimum number of receivers, a time multiplexing signal to noise power ratio loss equal to the number of antenna elements or subarrays shared by each receiver can occur. This loss can be excessive for an antenna with a large number of elements or subarrays. Further, the switch matrix can become complex and suffer from high cost and high RF loss. Accordingly, in an embodiment, the number of receivers is increased from one receiver. Alternatively, in another embodiment, the number of antenna outputs are minimized for systems that can withstand a smaller aperture and still provide acceptable performance.

Figure 3:
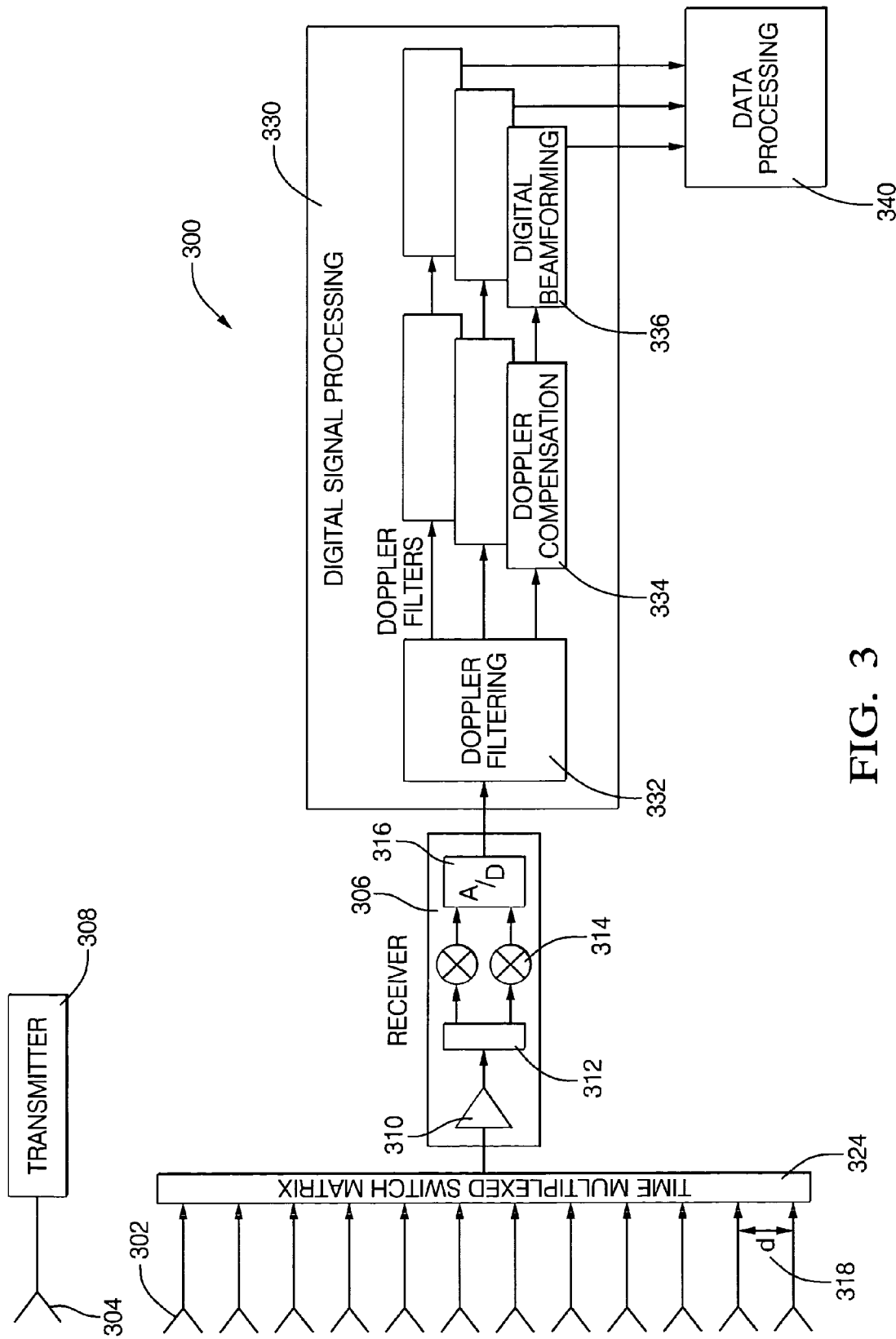
FIG. 3 is a diagrammatic sectional view of a time-multiplexed digital beamforming architecture having restructured digital signal processing with Doppler compensation, in accordance with an embodiment of the present invention.

Referring to FIG. 3, a time-multiplexed digital beamforming architecture having restructured digital signal processing 330 with Doppler compensation 334 in another embodiment of the present invention is shown. Additionally, as shown, receivers 306 directly receive the incoming signals from the antenna elements without utilizing a subarray feed network. Receiver 306 receives a signal from antenna elements 302 via a time multiplexed switch matrix 324. Also shown is transmitter 308 including antenna elements 304. Receiver 306 downconverts and digitizes the incoming signal from each antenna element. Receiver 306 can include an RF amplifier 310, a splitter 312 leading to a quadrature down converter 314, followed by an analog to digital converter 316. Receiver 306 transmits signals to the digital signal processor 330, followed by data processing 340. Again, the data processing 340 performs numerous functions including target detection, parameter estimation, target grouping, target tracking and target classification. As used herein, the term Doppler function includes Doppler/frequency filter 332 and Doppler compensation function 334.

Time multiplexed digital beamforming is suitable for targets without relative motion. Otherwise, target motion combined with the time sequenced sampling (from time multiplexing switch matrix 324) of the array elements or subarrays induces a differential phase shift across the array, which is not related to angle. In effect, target Doppler can distort the beam pattern. An ambiguity results due to both the time multiplexing switch matrix and the target Doppler effects.

In an embodiment, as shown in FIG. 3, a conventional digital signal processing sequence, which combines signals arriving from each antenna element, is restructured to perform Doppler/frequency filtering 332 for each antenna element output prior to digital beamforming 336. The received signal is partitioned into Doppler bins, and digital beamforming is utilized for the center of the Doppler bin. Given a sufficiently narrow Doppler bin width, such that the phase shift is localized, beams are formed for each Doppler filter, with appropriate Doppler compensation. One method of performing Doppler filtering is employing an FFT, which breaks up the received signal into Doppler bins. Thus, each Doppler/frequency filter 332 is tuned to a particular Doppler frequency. As an example, given a 16 point FFT, 16 output Doppler bins are produced. At the peak of the bin, for a particular Doppler, the phase shift versus time is known. Additionally, the time separation between receipt of the signal between the elements is known, since the time multiplexing scheme is known. Thus, for the known time delay between elements, a phase shift is applied, by Doppler compensation 334, which compensates for the Doppler phase shift for the center of the Doppler bin.

Then Doppler compensation 334 and digital beamforming 336 are performed separately for each Doppler/frequency filter 332, and thus the ambiguous time phase shift is resolved. The Doppler compensation 334 compensates for a target motion induced phase shift for the center frequency of the particular Doppler/frequency filter 332. Doppler induced beam pattern distortion inherent in the time multiplexed digital beamforming 336 is thus minimized.

It is to be appreciated that a small Doppler uncertainty remains since the Doppler/frequency filters 332 have a finite width, although it is much narrower as compared to managing absent target Doppler information. Any beam squints are reduced, since the target Doppler is narrowed to a small band. Thus, when beamforming separately on each Doppler/frequency filter 332, the beamforming is effectively uncorrupted by target Doppler.

Figure 4:
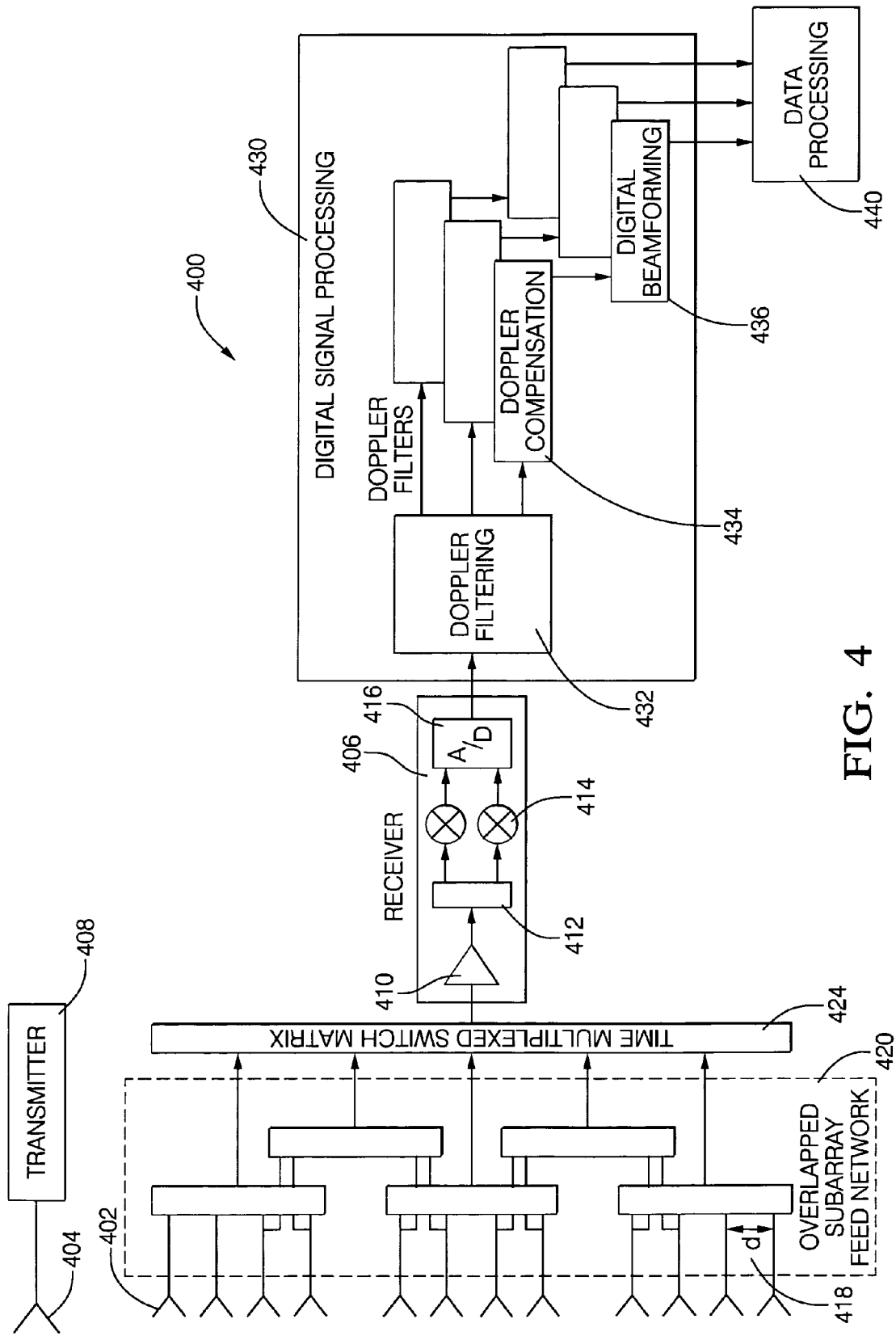
FIG. 4 is a diagrammatic sectional view of an overlapped subarray feed network and time-multiplexed digital beamforming architecture having restructured digital signal processing with Doppler compensation, in accordance with an embodiment of the present invention.

FIG. 4 illustrates an overlapped subarray feed network and time-multiplexed digital beamforming architecture 400 having restructured digital signal processing with Doppler compensation. Additionally, as shown, receiver 406 receives a signal from antenna elements 402 via overlapped subarray feed network 420 and time multiplexed switch matrix 424. Also shown is transmitter 408 including antenna elements 404. Receiver 406 downconverts and digitizes the incoming signal from each antenna subarray. Receiver 406 can include an RF amplifier 410, a splitter 412 leading to a quadrature down converter 414, followed by an analog to digital converter 416. Receiver 406 transmits signals to the digital signal processor 430, followed by data processing 440. Again, the data processing 440 performs numerous functions including target detection, parameter estimation, target grouping, target tracking and target classification. As used herein, the term Doppler function includes Doppler/frequency filter 432 and Doppler compensation function 434.

Similar to FIG. 3, an ambiguity results due to both the time multiplexing switch matrix and the target Doppler effects. Since a time multiplex switch matrix 424 is employed, a time difference occurs between data signals received at the receiver 406 from the time shared subarray feed network 420. Also, the target Doppler generates a time varying phase to the receiving data signals, which produces a varying phase across the subarray feed network 420. Thus, in an embodiment, a conventional digital signal processing sequence, which combines signals arriving from each antenna subarray, is restructured to perform Doppler/frequency filtering 432 for each antenna subarray output prior to digital beamforming 436. Each Doppler/frequency filter 432 is tuned to a particular Doppler frequency. Then Doppler compensation 434 and digital beamforming 436 are performed separately for each Doppler/frequency filter 432, and thus the ambiguous time phase shift is resolved. The Doppler compensation 434 compensates for a target motion induced phase shift for the center frequency of the particular Doppler/frequency filter 432. Doppler induced beam pattern distortion inherent in the time multiplexed digital beamforming 436 is minimized.

A further understanding of the above description can be obtained by reference to the following experimental example equations that are provided for illustrative purposes and are not intended to be limiting. The following equations serve as an example examination of time multiplexing as it relates to beamforming and target Doppler.

The beam steering phase shift between elements is:

$$\Delta \phi_{beam} = 2\pi \frac{d}{\lambda} \sin\theta,$$

where d is defined as the space between elements (as illustrated in FIGS. 1, 2, 3 and 4 as items 118, 218, 318 and 418, respectively), and θ is defined as the beam steering angle relative to antenna boresight.

The phase shift due to Doppler is:

$$\Delta \phi_{dop} = 2\pi f_{dop} \Delta t = 2\pi \left( \frac{2\dot{R}}{\lambda} \right) \Delta t,$$

$$\text{where } f_{dop} = \frac{2\dot{R}}{\lambda}$$

$\Delta \phi_{dop}$ is defined as the Doppler phase shift.
$\Delta t$ is defined as the time difference (i.e., between sampling of the elements or subarrays).
$\dot{R}$ is defined as the relative velocity, which is the first derivative of range with respect to time.
$\lambda$ is defined as the radar wavelength.
$f_{dop}$ is defined as the Doppler frequency.

Setting the beam steering phase shift equal to the Doppler phase shift provides the beam squint due to target Doppler, which can be shown as:

$$2\pi \frac{d}{\lambda} \sin\theta = 2\pi \left( \frac{2\dot{R}}{\lambda} \right) \Delta t$$

and thus, $$\sin\theta = \frac{2\dot{R} \Delta t}{d}. \quad \text{(Equation 1)}$$

Equation 1 assumes that the element spacing (d) is equal, and that linear switching exists between elements. Then, Doppler produces a linear phase shift across the array, which squints the beam.

For a given beam squint, the allowed time difference, $\Delta t$, is given by:

$$\Delta t = \frac{d \sin\theta}{2\dot{R}}.$$

Therefore, if elements or subarrays are spaced further apart, this allows more $\Delta t$ for the same beam squint, hence a slower switching speed.

For the standard phased array:

$$d = \frac{\lambda}{2}.$$

Inserting $$d = \frac{\lambda}{2}$$

into Equation 1 gives:

$$\sin\theta = \frac{2\dot{R}}{\lambda/2} \Delta t = 4\frac{\dot{R}}{\lambda} \Delta t,$$

and thus $$\Delta t = \frac{\lambda \sin\theta}{4\dot{R}}.$$

Therefore, more beam squint sensitivity occurs at a higher frequency since the element spacing is small. The present invention compensates for this, in part by restructuring the Digital Signal Processor as described.

In an embodiment of the present invention, a multi-mode radar system is provided. A short-range, medium-range and long-range multi-mode antenna can be realized by combining various antenna structures as described herein. For example, in an embodiment of the present invention, an antenna structure providing a wide field of view and moderately narrow beam is combined with an antenna providing a narrower field of view and narrow beam. A moderately narrow beam, as described herein, is to be understood as narrower as compared to a wide beam as selected and used by many conventional systems having an electrically small aperture and a minimal number of elements, as discussed supra with reference to FIG. 1. When a wide field of view is needed and a moderately narrow beam is adequate (as in the case of a short and/or medium range radar system), a non-overlapped time-multiplexed configuration may suffice (for example the configuration illustrated in FIG. 3). Here, the antenna is electrically small enough such that the antenna elements can be spaced by one-half of the radar wavelength, without requiring an excessive number of antenna elements. However, when a high gain and/or a narrow beam is needed and a narrower field of view is adequate (as in the case of a long range radar system), then a larger array and a large number of elements are utilized. In this case, as described above, the antenna is partitioned into overlapped subarrays with a time multiplexed configuration as illustrated in FIG. 2 and FIG. 4. It is to be appreciated that in the case of automotive applications, long-range is a distance of about 150 meters, medium-range is a distance of about 35 meters, and short-range is a distance of about 5 meters.

Figure 5:
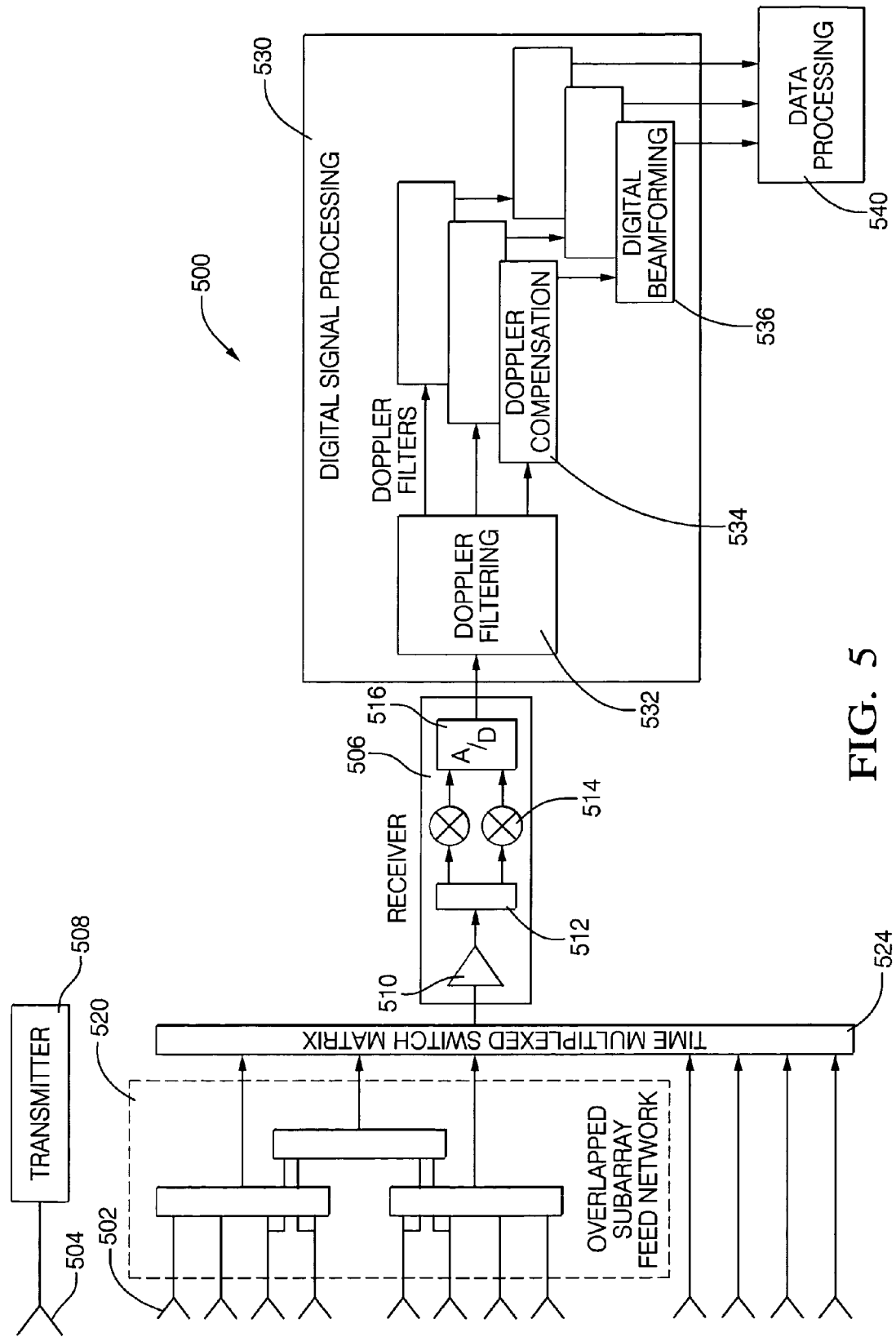
FIG. 5 is a diagrammatic sectional view of a multi-mode radar system having antenna elements arranged as short-range, medium-range and long-range antenna elements, including a time multiplexed digital beamforming architecture with restructured digital signal processing, in accordance with an embodiment of the present invention.

FIG. 5 illustrates a multi-mode radar system having antenna elements arranged as short-range, medium-range and long-range structures. A time multiplexed digital beamforming architecture 500 with restructured digital signal processing is additionally employed. An overlapped subarray feed network 520 is employed in the case for long range radar needs. Alternatively, in the case for short-range and medium-range, a non-overlapped configuration is employed. Receiver 506 receives a signal from antenna elements 502 via time multiplexed switch matrix 524. Also shown is transmitter 508 including antenna elements 504. Receiver 506 downconverts and digitizes the incoming signal from each antenna subarray. Receiver 506 can include an RF amplifier 510, a splitter 512 leading to a quadrature down converter 514, followed by an analog to digital converter 516. Receiver 506 transmits signals to the digital signal processor 530, followed by data processing 540. Again, the data processing 540 performs numerous functions including target detection, parameter estimation, target grouping, target tracking and target classification. Doppler/frequency filtering 532 is performed for each antenna subarray output prior to digital beamforming 536. Each Doppler/frequency filter 532 is tuned to a particular Doppler frequency. Then Doppler compensation 534 and digital beamforming 536 are performed separately for each Doppler/frequency filter 532, and thus any ambiguous time phase shift is resolved. The Doppler compensation 534 compensates for a target motion induced phase shift for the center frequency of the particular Doppler/frequency filter 532. Doppler induced beam pattern distortion inherent in the time multiplexed digital beamforming 536 is minimized.

It is to be appreciated that the discussion and embodiments as described herein apply to both one dimensional and two dimensional arrays, and apply to scanning in either dimension or both dimensions. That is, each element of a linear array (i.e., antenna elements 102, 202, 302 and 402) can represent an individual element and can additionally represent numerous elements in the orthogonal dimension combined into a single output by a "subarray" feed structure. The additional case represents a two dimensional array with one dimensional scanning and the "subarrays" in the orthogonal dimension are to be understood as distinct and separate subarrays as compared to overlapped subarrays 220 and 420. For two dimensional scanning, the time multiplexed digital beamforming architectures illustrated in FIGS. 2, 3 and 4 can be extended to both antenna dimensions by either time multiplexing individual elements or overlapped subarrays in the orthogonal dimension.

A further understanding of the above description can be obtained by reference to the following experimental beam pattern examples that are provided for illustrative purposes and are not intended to be limiting.

FIG. 6 is a graphical illustration of example beam patterns with uniform, non-overlapping subarrays. Eight subarrays are utilized and a 3.6 λ subarray spacing is formed. As illustrated, reducing the number of antenna outputs can lead to an undesirably large spacing between the subarray phase centers in the scanning dimension, leading to grating lobes.

Figure 7:
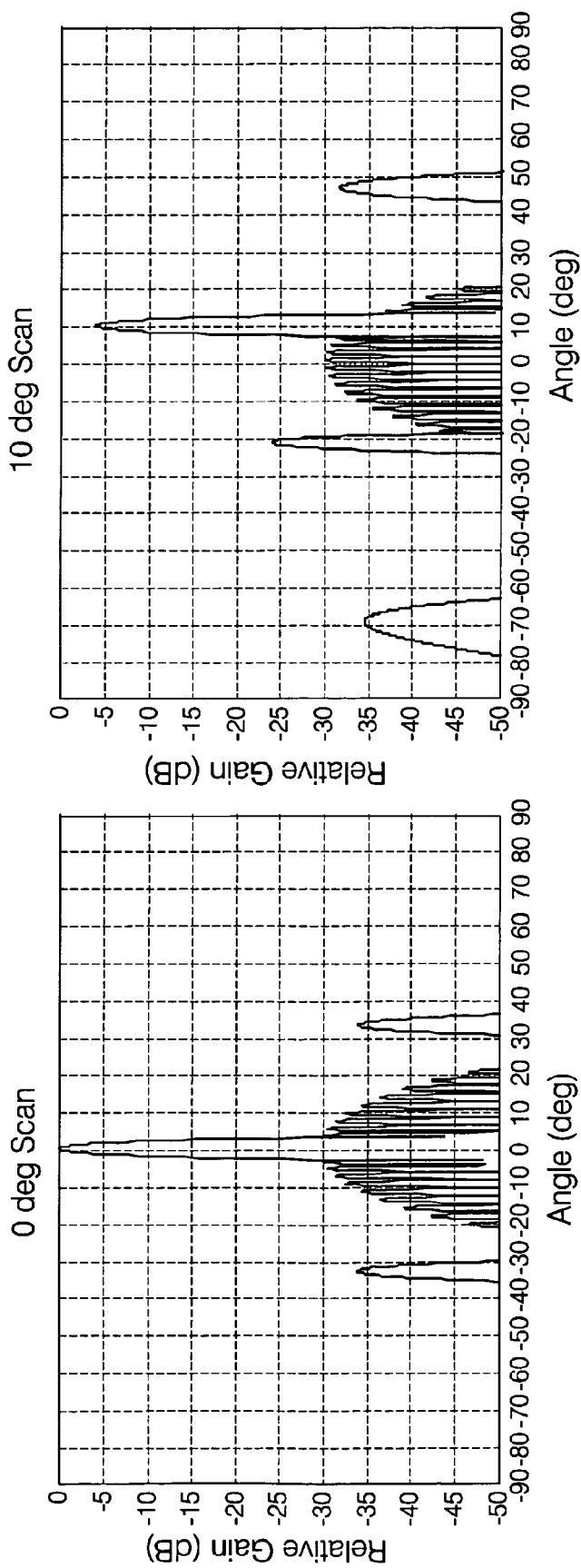
FIG. 7 is a graphical illustration of example beam patterns with uniform, overlapping subarrays, in accordance with an embodiment of the present invention.

FIG. 7 is a graphical illustration of example beam patterns with uniform, overlapping subarrays, in accordance with an embodiment of the present invention. In contrast to the example illustrated in FIG. 5, fifteen overlapped subarrays are utilized and a 1.8 λ subarray spacing is formed. When uniform overlapping subarrays are employed, grating lobes are eliminated and low sidelobes are formed. As illustrated, the antenna beam is scanned without grating lobes or high sidelobes.

Other features and advantages of this invention will be apparent to a person of skill in the art who studies this disclosure. Thus, exemplary embodiments, modifications and variations may be made to the disclosed embodiments while remaining within the spirit and scope of the invention as defined by the appended claims.

We claim:

1. An electronically scanned radar system comprising:
    a predetermined number of antenna elements for transmitting a received signal to a receiver;
    a digital beam former performing a digital beamforming function for controlling sensitivity of the antenna elements;
    a time multiplexed switch matrix for timing the transmission of the received signal from the antenna elements to the receiver; and
    a Doppler function for managing a target motion induced phase shift across the antenna elements with the digital beam former, wherein the Doppler function is performed on the received signal prior to the digital beamforming function, and the Doppler function comprises a Doppler frequency filter followed by a Doppler compensation function, wherein the Doppler frequency filter differentiates between a multiple number of the received signals, the Doppler compensation function compensates for the target motion induced phase shift for a center frequency of a particular Doppler frequency filter, and the Doppler compensation function and the digital beamforming function are performed separately.

2. The electronically scanned radar system as in claim 1, further comprising:
    an overlapped subarray feed network for receiving the received signals from the antenna elements and transmitting the received signals to the time multiplexed switch matrix, for forming a predetermined phase center spacing to define a location of a grating lobe.

3. The electronically scanned radar system as in claim 1, wherein the antenna elements transmit to one receiver.

4. The electronically scanned radar system as in claim 1, wherein the radar system is a multi-mode radar system, and wherein the antenna elements are arranged as short-range, medium-range and long-range antenna elements.

5. The electronically scanned radar system as in claim 1, further comprising a transmitter for transmitting a signal to a target for return to the antenna elements.

6. The electronically scanned radar system as in claim 1, further comprising a data processing function to receive a signal from the digital beamforming function.

7. A method of digital beamforming in an electronically scanned radar system comprising:
    forming a predetermined number of antenna elements to transmit a received signal to a receiver;

controlling the sensitivity of the antenna elements by performing a digital beamforming function in a digital beam former;

forming a time multiplexed switch matrix to time the transmission of the received signal from the antenna elements to the receiver; and utilizing a Doppler function on the received signal prior to the digital beamforming function to manage a target motion induced phase shift across the antenna elements with the digital beam former, wherein utilizing the Doppler function comprises employing a Doppler frequency filter followed by a Doppler compensation function, the Doppler frequency filter to differentiate between a multiple number of the received signals, and the Doppler compensation function to compensate for the target motion induced phase shift for a center frequency of a particular Doppler frequency filter.

8. The method of digital beamforming as in claim 7, further comprising:

overlapping a subarray feed network to receive the received signals from the antenna elements and transmit the received signals to the time multiplexed switch matrix, to form a predetermined phase center spacing to define a location of a grating lobe.

9. The method of digital beamforming as in claim 7, further comprising transmitting the received signal from the antenna elements to one receiver.

10. The method of digital beamforming as in claim 7, further comprising arranging the antenna elements as short-range, medium-range and long-range antenna elements, and utilizing the radar system as a multi-mode radar system.

11. An electronically scanned radar system comprising:

a predetermined number of antenna elements for transmitting a received signal to a receiver;

an overlapped subarray feed network for receiving the received signals from the antenna elements, and for forming a predetermined phase center spacing to define a location of a grating lobe;

a digital beam former for controlling the sensitivity of the antenna elements; and a time multiplexed switch matrix for receiving the received signals from the overlapped subarray feed network, and for timing the transmission of the received signals to the receiver a Doppler function comprising a Doppler frequency filter followed by a Doppler compensation function, wherein the Doppler function is performed on the recieved signal prior to the digital beamforming function, the Doppler frequency filter differentiates between a multiple number of the received signals, and the Doppler compensation function compensates for the target motion induced phase shift for a center frequency of a particular Doppler frequency filter, wherein the Doppler compensation function and the digital beamforming function are performed separately on each frequency of the recieved signals from the Doppler frequency filter.

12. The electronically scanned radar system as in claim 11, wherein the antenna elements transmit to one receiver.

13. The electronically scanned radar system as in claim 11, further comprising a transmitter for transmitting a signal to a target for return to the antenna elements.

14. The electronically scanned radar system as in claim 11, further comprising a digital signal processing function and a data processing function to receive a signal from the receiver.

* * * * *